United States Patent
Fanslau, Jr. et al.

(10) Patent No.: US 7,436,631 B1
(45) Date of Patent: Oct. 14, 2008

(54) HEATED GIMBAL FOR MAGNETIC HEAD TO DISK CLEARANCE ADJUSTMENT

(75) Inventors: Edmund Bruno Fanslau, Jr., San Jose, CA (US); Mark Re, Pittsburgh, PA (US)

(73) Assignee: Western Digital (Fremont), LLC, Fremont, CA (US)

( * ) Notice: Subject to any disclaimer, the term of this patent is extended or adjusted under 35 U.S.C. 154(b) by 748 days.

(21) Appl. No.: 10/882,542

(22) Filed: Jun. 30, 2004

(51) Int. Cl.
*G11B 5/56* (2006.01)

(52) U.S. Cl. .................................... 360/294.7
(58) Field of Classification Search ............... 360/294.7, 360/294.4, 294.3, 264.5, 246.7, 245.3
See application file for complete search history.

(56) References Cited

U.S. PATENT DOCUMENTS

| | | | |
|---|---|---|---|
| 5,687,479 A | | 11/1997 | Bennin et al. |
| 5,883,758 A | | 3/1999 | Bennin et al. |
| 6,078,473 A | * | 6/2000 | Crane et al. ............... 360/294.3 |
| 6,307,719 B1 | * | 10/2001 | Mallary .................... 360/294.7 |
| 6,597,539 B1 | * | 7/2003 | Stupp et al. ............... 360/245.7 |
| 6,707,646 B2 | * | 3/2004 | Berger et al. ............. 360/294.7 |
| 6,765,765 B2 | * | 7/2004 | Bement et al. ........... 360/294.3 |
| 6,952,330 B1 | * | 10/2005 | Riddering et al. ........ 360/294.7 |
| 6,999,265 B1 | * | 2/2006 | Schreck et al. ................. 360/75 |
| 7,239,485 B2 | * | 7/2007 | Boutaghou et al. ....... 360/245.9 |

* cited by examiner

*Primary Examiner*—Angel A Castro
(74) *Attorney, Agent, or Firm*—Carr & Ferrell, LLP

(57) ABSTRACT

A head gimbal assembly having a suspension and a read/write head is provided. The read write head is attached to a flexure tongue of the suspension. Heating elements on arms of the suspension, set on either side of the suspension tongue, are used to alter flight characteristics of the read/write read such as pitch and roll. Due to differences in the coefficients of thermal expansion of the materials that comprise the arms, the arms bend when heated. Varying the heat output of the heating elements changes the temperatures of the arms, which changes the degree to which the arms are bent. The heating elements can be portions of traces in a trace layer. Control circuitry is provided to control the heating of the heating elements to maintain desired values of the flight characteristics.

24 Claims, 6 Drawing Sheets

HEATED GIMBAL FOR MAGNETIC HEAD TO DISK CLEARANCE ADJUSTMENT

BACKGROUND OF THE INVENTION

1. Field of the Invention

The present invention relates generally to the field of magnetic disk drives, and more particularly to an adjustable suspension for fine tuning a clearance between a read/write head and a magnetic disk.

2. Description of the Prior Art

Magnetic disk drives are used to store and retrieve data for digital electronic apparatuses such as computers. In FIGS. 1 and 2, a magnetic disk data storage system 10 includes an enclosure 12 (shown in cross-section), a disk drive motor 14, and a magnetic disk, or media, 16 supported for rotation by a drive spindle 17 of motor 14. Also included are an actuator 18 and an arm 20 attached to an actuator spindle 21 of actuator 18. A suspension 22 is coupled at one end to the arm 20 and at another end to a read/write head 24. The suspension 22 and the read/write head 24 are commonly collectively referred to as a head gimbal assembly (HGA). The read/write head 24 typically includes an inductive write element and a magnetoresistive read element that are held in a very close proximity to the magnetic disk 16. As the motor 14 rotates the magnetic disk 16, as indicated by the arrow R, an air bearing is formed under the read/write head 24 causing the read/write head 24 to lift slightly off of the surface of the magnetic disk 16, or, as it is commonly termed in the art, to "fly" above the magnetic disk 16. Data bits can be written or read along a magnetic "track" of the magnetic disk 16 as the magnetic disk 16 rotates past the read/write head 24. The actuator 18 moves the read/write head 24 from one magnetic track to another by pivoting the arm 20 and the suspension 22 in an arc indicated by arrows P. The design of magnetic disk data storage system 10 is well known to those skilled in the art.

The magnetic disk data storage industry has been very successful at achieving ever greater data densities on magnetic disks 16 by pursuing the miniaturization of various components such as the read/write head 24. In particular, the miniaturization of the read/write head 24, in combination with advances in their designs and the surfaces of magnetic disks 16, has supported ever increasing data densities by allowing the read/write head 24 to fly ever closer to the surface of the magnetic disk 16. Lower fly heights are advantageous because the decreased spacing between the read/write head 24 and the magnetic disk 16 allows for a size of the data bits written to the magnetic disk 16 to be reduced, and for such smaller data bits to be sensed by the read element of the read/write head 24. Unfortunately, lower fly heights also increase the likelihood that the flying read/write head 24 will collide catastrophically ("crash") with the magnetic disk 16.

Moreover, the read/write head 24 does not maintain the same fly height under all circumstances. For example, the fly height varies as a function of the position over the magnetic disk 16, in other words, the fly height for the read/write head 24 is different when positioned over the inside diameter (ID), center, and outside diameter (OD) of the magnetic disk 16. Likewise, changes in air pressure due to changes in temperature or elevation will also effect the fly height. Accordingly, what were once minor variations in fly height become significant variations as the spacing between the read/write head 24 and the magnetic disk 16 is further decreased.

Therefore, what is needed is a mechanism for actively adjusting the fly height of a read/write-head to maintain a more uniform spacing between the read/write head and a disk.

SUMMARY

The invention provides a suspension for a read/write head. The suspension includes two arms coupled to, and disposed on opposite sides of, a flexure tongue. The read/write head can be attached to the flexure tongue. Each arm of the suspension includes a heating element, and the heating elements are operable to bend the arms to controllably alter a flight characteristic, such as pitch and roll, of the read/write head. The heating elements are contiguously bonded to the arms of the suspension to provide good heat conduction from the heating elements to the arms. Heating the arms cause the arms to bend which alters the flight characteristic of the read/write head. In some embodiments the arms include two layers having different coefficients of thermal expansion, and in some of these embodiments the two layers include a stainless steel substrate and a polyimide layer.

The heating elements can include electrical resistance heaters, and in some embodiments the electrical resistance heaters are joined in a series circuit. In some embodiments a trace layer attached to the arms includes the electrical resistance heaters. In some of these embodiments the trace layer further includes a communication trace having a width and a thickness. The heater trace can have a thickness less than the thickness of the communication trace, or a width less than the width of the communication trace, or both. In some embodiments the heater trace is narrowed in an electrical resistance heater portion. Similarly, in some embodiments the heater trace is thinned in the electrical resistance heater portion. Further, the electrical resistance heater portion can traverse a width of the arm in a zig-zag manner.

The invention also provides a disk drive comprising a suspension and a read/write head. A flexure tongue of the suspension supports the read/write head. The suspension also includes two arms disposed on opposite sides of, and coupled to, the flexure tongue. Each arm includes a heating element contiguously bonded thereto. The heating elements are operable to bend the arms to controllably alter a flight characteristic of the read/write head. The disk drive can further comprise read and control circuits. The read circuit is configured to receive a read signal from the read/write head, and the control circuit is configured to adjust a heat output of the heating elements in response to an intensity of the read signal. The disk drive can also comprise a roll circuit configured to determine a degree of roll of the read/write head. In these embodiments the control circuit can be configured to adjust a heat output of the heating elements in response thereto. In some embodiments the heating elements include electrical resistance heaters and the control circuit adjusts the heat output thereof by adjusting electrical currents thereto.

DETAILED DESCRIPTION OF THE INVENTION

The invention takes advantage of the different coefficients of thermal expansion of the layered materials that comprise read/write head suspensions in magnetic disk drives. By appropriately heating portions of a suspension, those portions can be made to bend as one layer expands more than another. Adjusting the degree to which these portions are bent adjusts the fly height of the read/write head. A feedback loop can be configured to monitor the intensity of a data signal read from the magnetic disk, and, based on that intensity, adjust the amount of heating to raise or lower the read/write head in order to maintain a desired fly height.

Figure 1:
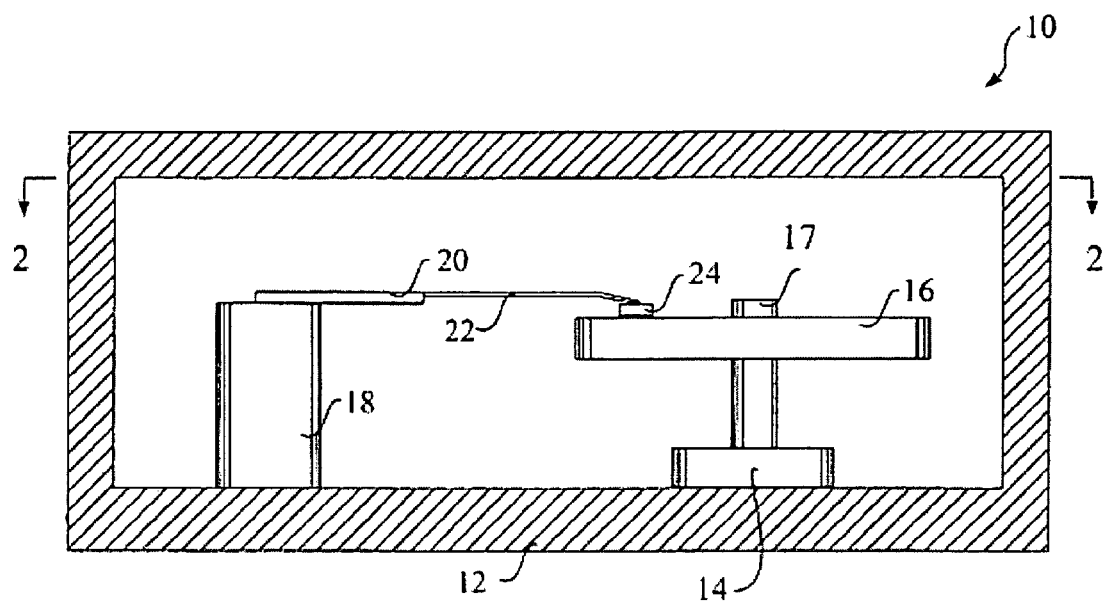
FIGS. 1 and 2 are side and top views of a magnetic disk data storage system according to the prior art.
Figure 2:
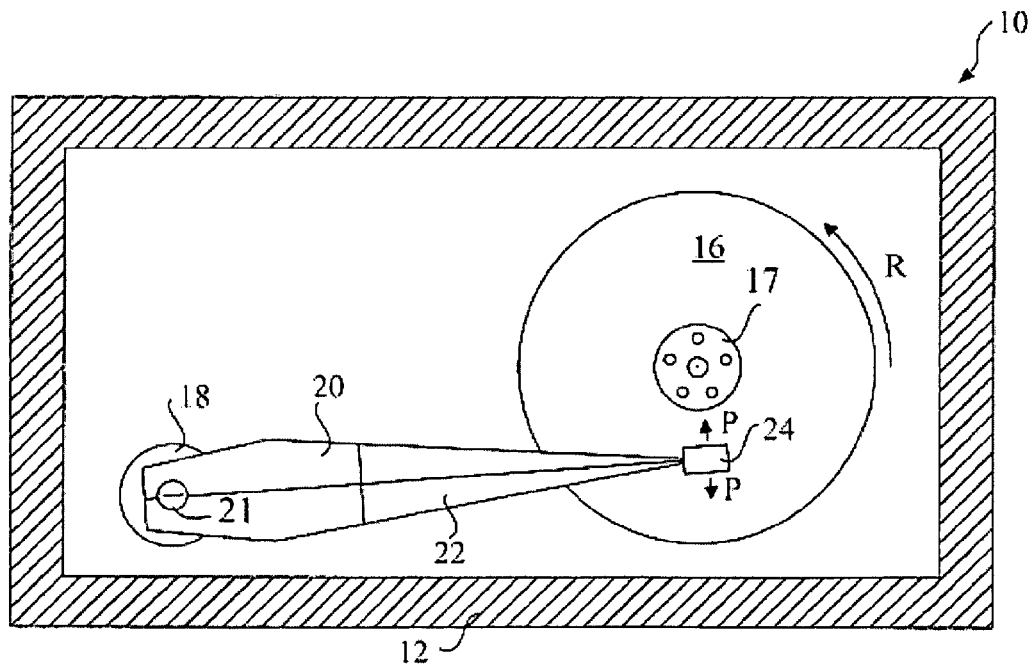
Figure 3:
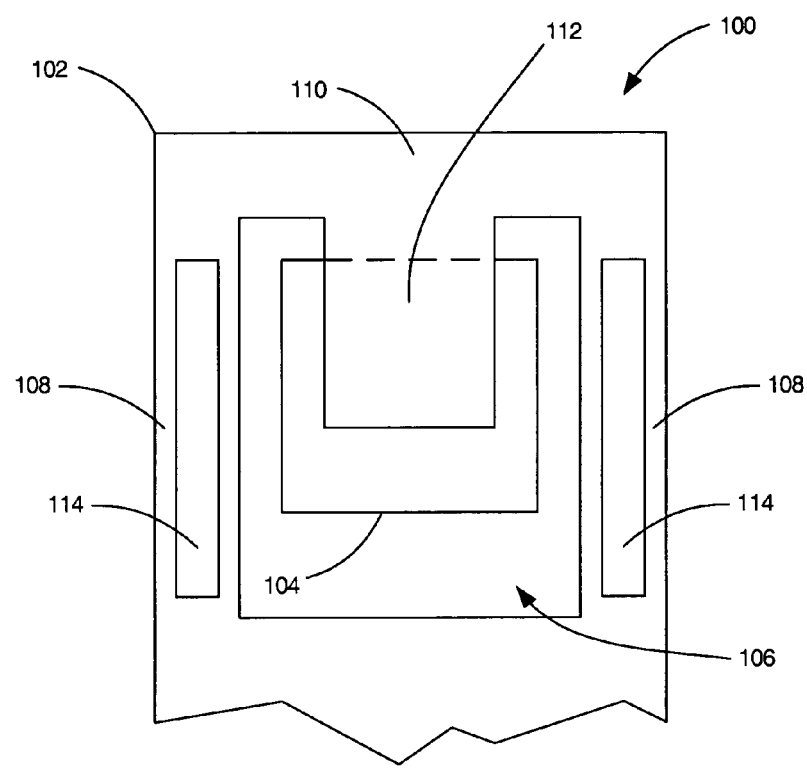
FIG. 3 is a top view of a head gimbal assembly (HGA) according to an exemplary embodiment of the invention.
Figure 4:
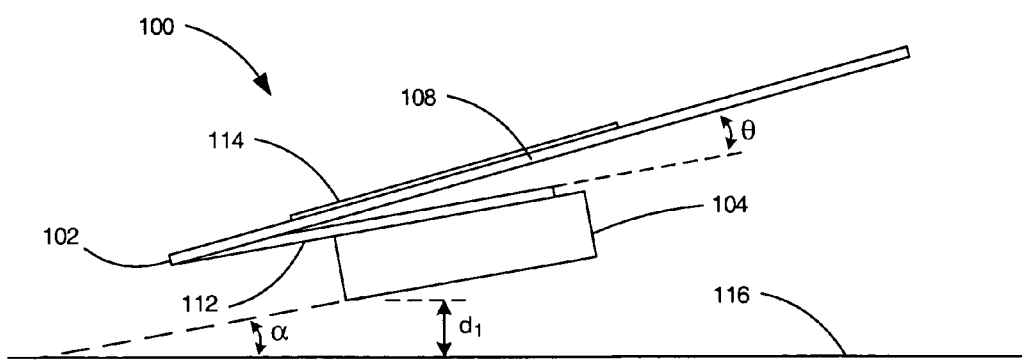
FIG. 4 is a side view of the HGA of FIG. 3.

FIGS. 3 and 4 show, respectively, top and side views of an exemplary embodiment of the invention. A head gimbal assembly (HGA) 100 comprises a suspension 102 and a read/write head 104. The suspension 102 includes an aperture 106 formed between two arms 108. A cross member 110 connects the two arms 108 at an end of the suspension 102. The suspension 102 also includes a flexure tongue 112 that projects from the cross member 110 beneath the aperture 106. It can be seen from the side view of FIG. 4 that the flexure tongue 112 forms an acute angle, θ, relative to a plane defined by the two arms 108. The read/write head 104 attaches to an underside of the flexure tongue 112.

Each arm 108 includes at least one heating element 114. Heat produced by the heating elements 114 is effective to cause bending of the arms 108 to alter a flight characteristic of the read/write head 104 relative to a disk 116. Each heating element 114 is contiguously bonded to its respective arm 108. As used herein, contiguously bonded means that the heating element 114 and the arm 108 are bonded together over at least a substantial portion of the length of the heating element 114. In most instances the bonding is continuous over the entire length of the heating element 114. Although small gaps in the bonding can be tolerated, continuous bonding is desirable for optimal heat conduction between the heating element 114 and the arm 108.

Figure 5:
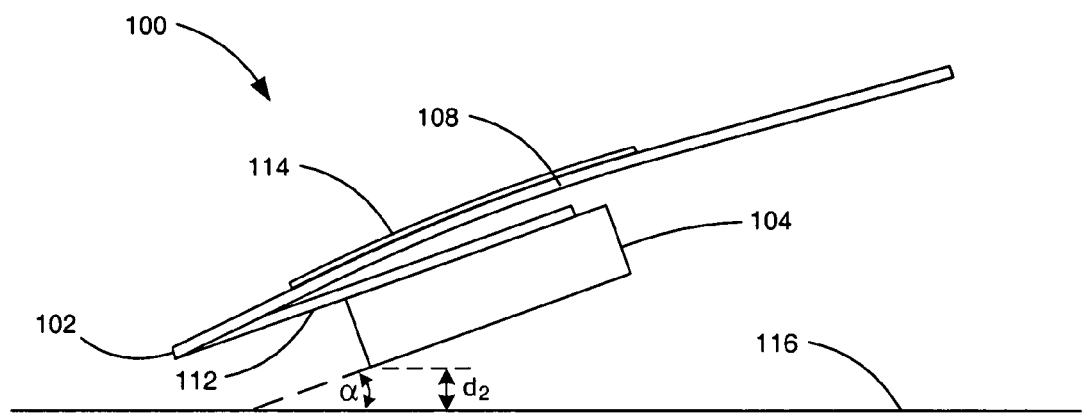
FIG. 5 is a side view of the HGA of FIG. 3 bent towards a surface of a disk according to an exemplary embodiment of the invention.

FIG. 5 illustrates the effect of heating the arms 108. It can be seen that the arms 108 bend where heated by the heating elements 114 and, accordingly, an attitude of the read/write head 104 changes relative to the disk 116. This attitude, commonly called pitch, is represented in FIG. 4 by the angle $\alpha_1$. Increasing the pitch from $\alpha_1$ to $\alpha_2$ (FIG. 5) lowers the amount of lift generated by the air bearing beneath the read/write head 104 and causes a spacing between the read/write head 104 and the disk 116 to decrease from $d_1$ in FIG. 4 to $d_2$ in FIG. 5. In some instances heating the arms 108 by 50° C. will increase the pitch ($\alpha_2$-$\alpha_1$) by about 50 to 100 μradians which is effective to lower the fly height by about 5 nm. It will also be appreciated that by differentially heating the arms 108 it is also possible to affect another flight characteristic, namely roll. It will be appreciated that although the heating elements 114 are shown as being located on top of the arms 108 in FIG. 5, the heating elements 114 will also function to heat and bend the arms 108 when disposed on the underside thereof.

Figure 6:
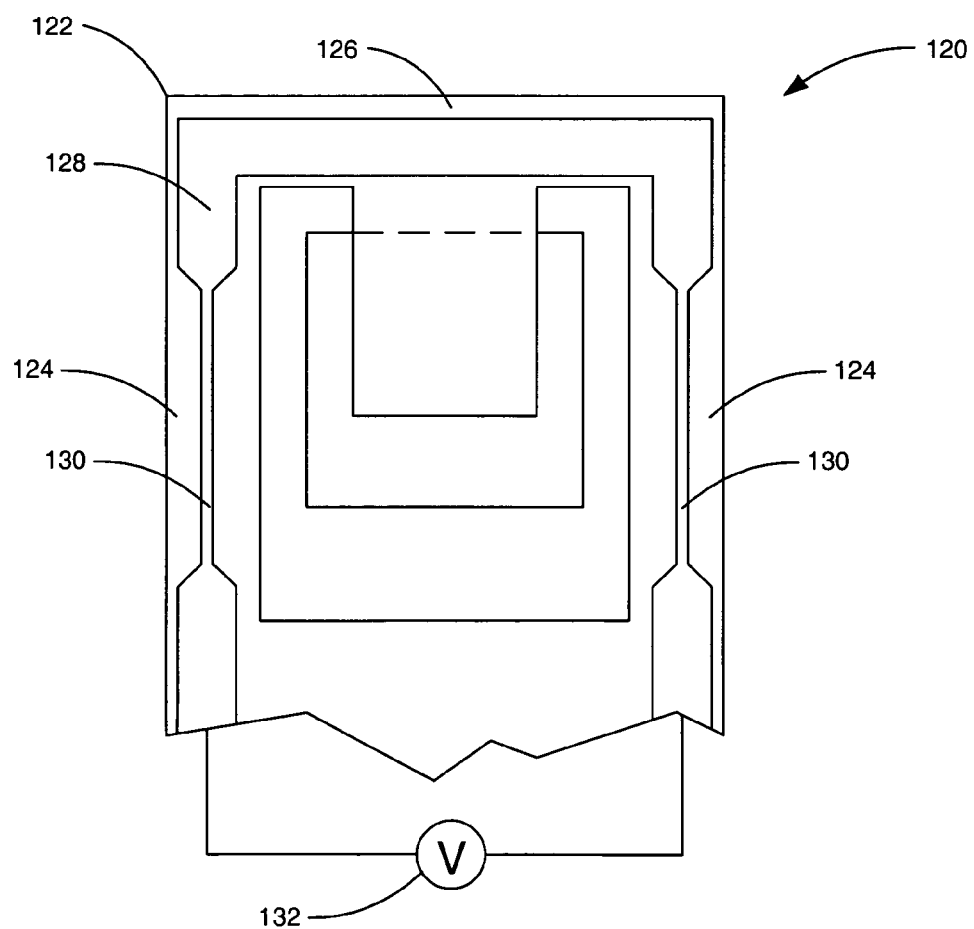
FIG. 6 is a top view of a HGA according to another exemplary embodiment of the invention.

FIG. 6 illustrates a particular implementation of an HGA 120 according to the invention. HGA 120 includes a suspension 122 having two arms 124 and a cross member 126 connecting the two arms 124 at an end of the suspension 122. The suspension 122 also includes a conductive trace 128 that extends along one arm 124, across the cross member 126, and along the other arm 124. A heating element portion of the trace 128 on each arm 124 forms a heating element 130. The heating elements 130 in these embodiments are electrical resistance heaters and are joined in a series circuit, as shown. A variable power supply 132 is electrically connected to the trace 128 to provide a variable current through the trace 128.

The heating elements 130 can be provided with a higher electrical resistance than the remainder of the trace 128 in a number of ways. For example, the width of the trace 128 can be narrowed in the portion that comprises the heating elements 130. Similarly, the thickness of the trace 128 can also be reduced in the portion that comprises the heating elements 130. Another option is to form the heating elements 130 from a conductive material with a higher electrical resistance. Where the trace 128 is copper, a higher resistance material for the heating elements 130 can be nickel or nichrome. Even the resistivity of copper can be made different in the heating elements 130 as compared to the remainder of the trace 128 by using different seed layers prior to copper plating to affect the copper crystal structures in the respective areas.

Figure 7:
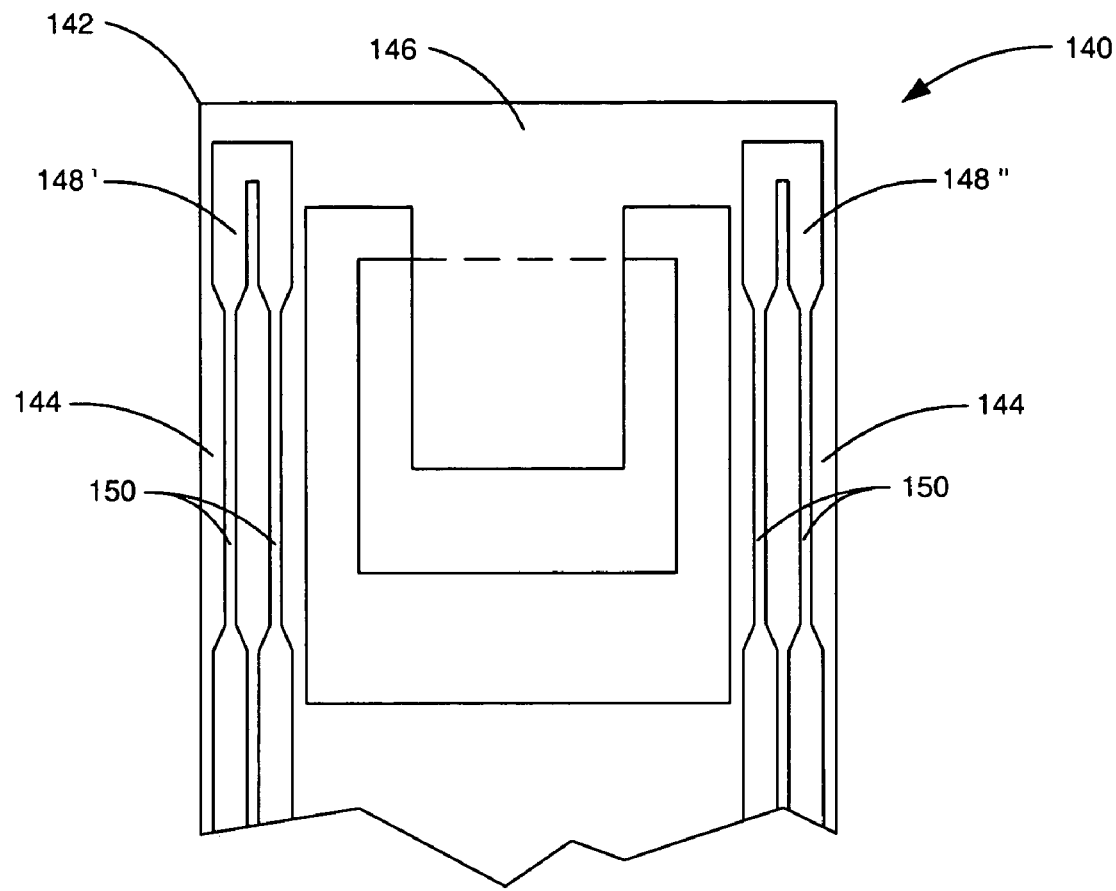
FIG. 7 is a top view of a HGA according to yet another exemplary embodiment of the invention.

FIG. 7 illustrates another particular implementation of an HGA 140 according to the invention. HGA 140 includes a suspension 142 having two arms 144 and a cross member 146 connecting the two arms 144 at an end of the suspension 142. The suspension 142 also includes conductive traces 148' and 148" such that each of the arms 144 includes one of the conductive traces 148' and 148". Each of the traces 148' and 148" extend along the length of the respective arm 144 and include a heating element 150 provided with a higher electrical resistance than the remainder of the trace 148', 148". Since the traces 148' and 148" are not joined in a series circuit, the heating elements 150 can be operated independently to control roll instead of, or in addition to, controlling pitch.

Figure 8:
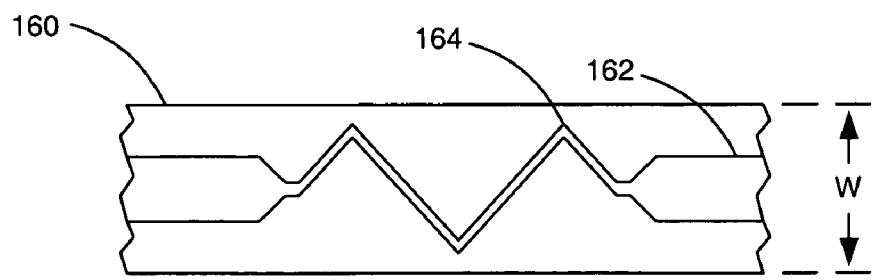
FIG. 8 is a top view of a heating element on a suspension arm according to an exemplary embodiment of the invention.

FIG. 8 illustrates an exemplary embodiment of a heating element of the invention. In FIG. 8 an arm 160 includes a trace 162 having a heating element 164 with a zig-zag shape. Having the heating element 164 traverse back and forth across a width, W, of the arm 160 multiple times serves both to increase the overall length of the heating element 164 and provides more uniform heating across the width of the arm 160. It should be noted that the parallel segments of the heating elements 150 in FIG. 7 also illustrate this concept. It will be appreciated that the heating element 164 can alternatively be made to traverse the width of the arm 160 with a square-wave pattern, a triangle-wave pattern, a sinusoidal pattern, and so forth.

Figure 9:
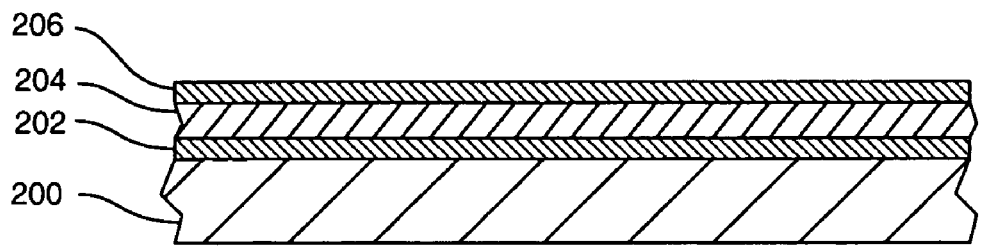
FIGS. 9-11 are cross-sectional views of different exemplary embodiments of heating elements of the invention.
Figure 10:
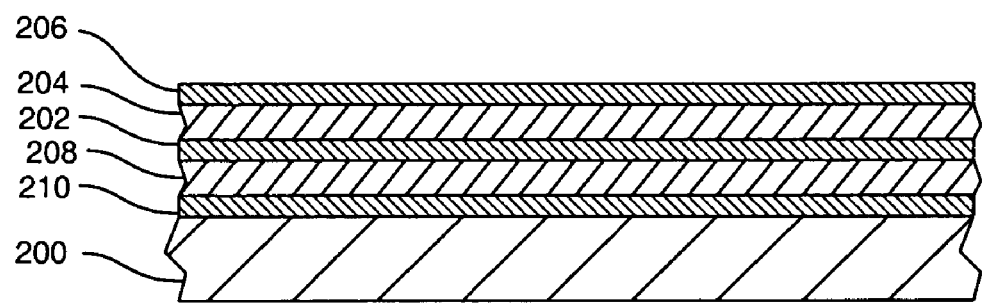
Figure 11:
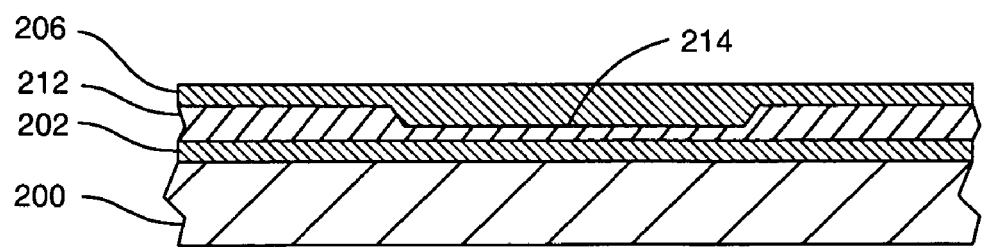

FIGS. 9-11 show cross-sections of exemplary embodiments of the heating element of the invention contiguously bonded to the suspension arm. In FIG. 9 a substrate 200 forms the structural support of the suspension arm 108 (FIGS. 3-5). The substrate 200 is preferably formed of a material with suitable mechanical properties for use as a suspension 102 in an HGA 100 (FIGS. 3-5), for example, stainless steel. A layer 202 of an electrically insulating material, such as polyimide, is formed over the substrate 200. Layer 202 electrically insulates the substrate 200 from a trace 204 which is formed over the layer 202. The coefficient of thermal expansion for polyimide is on the order of 20 ppm/° C. (i.e. $20 \times 10^{-6}$/° C.), whereas the coefficient of thermal expansion for stainless steel is on the order of 17 ppm/° C.

The trace 204 preferably includes a material having good electrical conductivity, such as copper. The trace 204, in some embodiments, is patterned to form traces 128, 148 and 162 (FIGS. 6-8) according to traditional conductive line fabrication techniques known in the semiconductor and printed circuit board arts. Accordingly, a portion of the trace 204 that forms a heating element is contiguously bonded to the layers 200, 202 that comprise the suspension arm 108 (FIGS. 3-5). Since the coefficients of thermal expansion of the substrate 200 and the layer 202 are different, bending occurs when the two are heated by the heating element portion of the trace 204, as described above.

A capping layer 206 is disposed over the trace 204 to protect the trace 204 from corrosion. In some embodiments the capping layer 206 is a layer of a noble metal, such as gold, that conforms generally to the pattern of the heater trace in the trace 204. In other embodiments the capping layer 206 is a blanket layer of an insulating material such as polyimide. In further embodiments the capping layer includes both a noble metal that conforms to the heater trace with a blanket of an insulating material thereover. Other suitable materials that can be substituted for polyimide as the capping layer 206 include paints and epoxies that are well known for covering traces on prior art suspensions. Some of these materials have coefficients of thermal expansion on the order of 100 to 200 ppm/° C. which can further contribute to bending the arm 108 (FIGS. 3-5) with heating.

FIG. 10 shows a cross-section similar to the one shown in FIG. 9. The embodiments of FIG. 10 include a substrate 200, a layer 202 of an insulating material, a trace 204, and a capping layer 206 as described above. Additionally, the embodiments of FIG. 10 include a ground plane layer 208 and an optional insulation layer 210. The ground plane layer 208 is preferably formed of a highly conductive material such as copper and the insulation layer 210 is preferably formed of an electrically insulating material such as polyimide. Since the purpose of the ground plane layer 208 is to serve as an electrical ground for the suspension, it will be appreciated that the ground plane layer 208 does not have to be electrically insulated from the substrate 200, and can optionally be formed directly thereon. In the embodiments shown in FIG. 9 the substrate 200 can provide the same function as the ground plane layer 208.

It will be understood that some prior art HGAs have structures similar to those described with respect to FIGS. 9 and 10. In such prior art HGAs a trace layer is patterned to include conductive lines for carrying read and write signals across the suspension 102 and to the read/write head 104 (FIGS. 3-5).

In some embodiments of the invention the trace 204 is disposed within a common trace layer that includes both communication traces for carrying read and write signals and heater traces such as traces 128, 148 and 162 (FIGS. 6-8). Other embodiments of the invention provide communication traces in a communication trace layer and heater traces in a heater trace layer separated by an insulation layer. In some embodiments the communication and heater traces generally have the same width, however the heater traces have heating element portions with more narrow widths for increased electrical resistance in order to provide heating elements 130, 150, and 162 (FIGS. 6-8).

FIG. 11 shows an embodiment of the invention similar to the one shown in FIG. 9. In this embodiment a trace 212 is thinned within a heating element portion 214 in order to increase the electrical resistance of the heating element portion 214 relative to the electrical resistance of the remainder of the trace 212. In some embodiments of the invention the trace 212 has the same thickness as the communication traces for carrying read and write signals except in the heating element portion 214. Forming the heating element portion 214 so that it is thinner than the remainder of the trace 212 can be achieved through well known plating techniques. It can also be achieved by selectively etching the trace 212.

Figure 12:
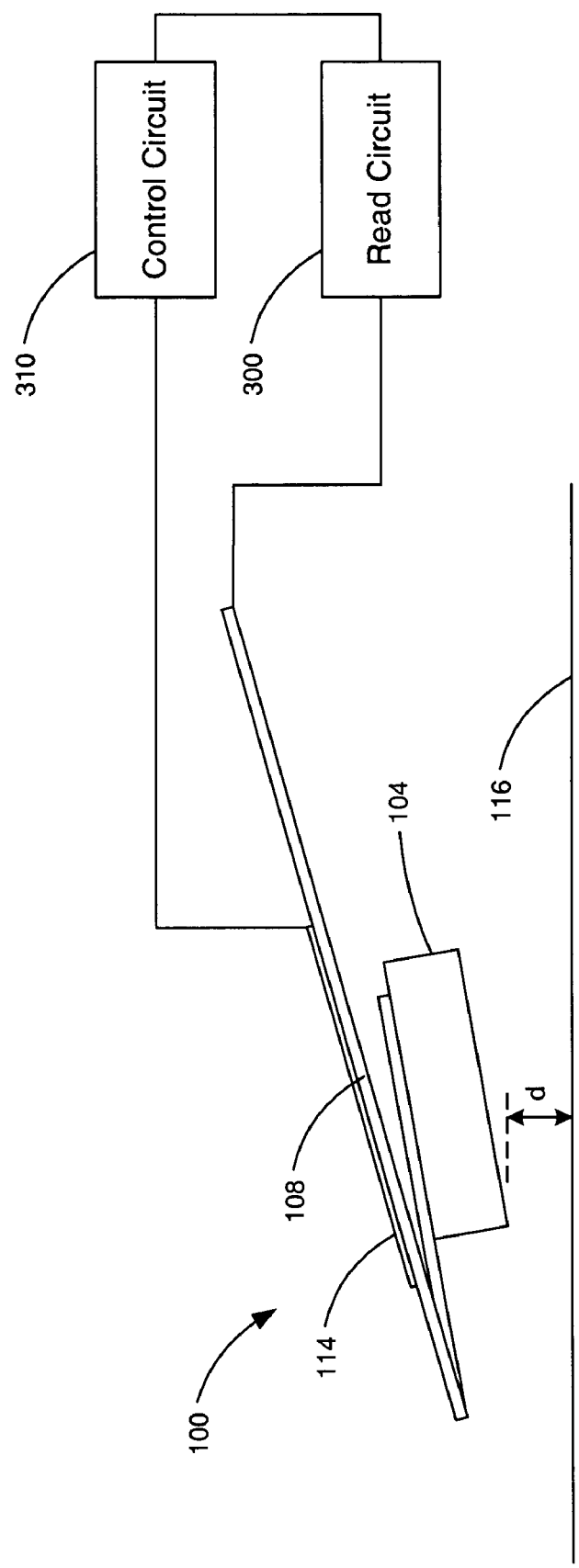
FIG. 12 is a schematic representation of exemplary control circuitry coupled to the HGA of FIG. 3.

FIG. 12 schematically illustrates the integration of circuitry with the HGA 100 (FIG. 4) to create a feedback loop that is able to control a spacing, d, between the read/write head 104 and the disk 116. As shown, a read circuit 300 is configured to receive a read signal from the read/write head 104 as the read/write head 104 reads data from the disk 116. As is well known in the art, an intensity of the read signal is inversely proportional to the spacing, d, in accordance with the Wallace spacing loss.

A control circuit 310 is configured to move the read/write head 104 in accordance with the intensity of the read signal from the read circuit 300. For example, if the intensity of the read signal falls, the control circuit 310 raises the temperature of the heating elements 114 to heat and bend the arms 108 to move the read/write head 104 closer to the disk 116. Likewise, whenever the intensity of the read signal grows too high, indicating that the read/write head 104 is approaching too close to the disk 116, the control circuit 310 lowers the temperature of the heating elements 114 to move the read/write head 104 away from the disk 116. The control circuitry 310 can adjust the temperature of the heating elements 114, for example, by varying an output of a power supply 132 to a trace 128, as shown in FIG. 6.

It will be appreciated that the same concept can be extended to controlling a degree of roll of the read/write head 104. Accordingly, in some embodiments a roll circuit is configured to adjust the degree of roll of the read/write head 104. The roll circuit can be part of the control circuit 310 or a separate circuit. To correct for roll, the control circuit 310 controls the heating elements 114 of the arms 108 independently so that the arms bend to different degrees. The control circuitry 310 can independently adjust the temperatures of the heating elements 114, for example, by varying electric currents supplied to traces 148, as shown in FIG. 7.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A suspension for a read/write head comprising:
   a flexure tongue for attaching the read/write head thereto;
   two arms disposed on opposite sides of, and coupled to, the flexure tongue, each arm including a heating element contiguously bonded thereto, the heating elements being operable to bend the arms to controllably alter a flight characteristic of the read/write head wherein the heating elements include electrical resistance heaters; and
   a trace layer attached to the arms and including a heater trace, wherein the heater trace includes the electrical resistance heaters.

2. The suspension of claim 1 wherein the electrical resistance heaters are joined in a series circuit.

3. The suspension of claim 1 wherein the trace layer further includes a communication trace having a width and a thickness.

4. The suspension of claim 3 wherein the heater trace has a thickness less than the thickness of the communication trace.

5. The suspension of claim 3 wherein the heater trace has a width less than the width of the communication trace.

6. The suspension of claim 1 wherein the heater trace is narrowed in an electrical resistance heater portion.

7. The suspension of claim 1 wherein the heater trace is thinned in an electrical resistance heater portion.

8. The suspension of claim 1 wherein portions of the heater trace that comprise the electrical resistance heaters each traverse a width of the arms.

9. The suspension of claim 8 wherein the two layers include a stainless steel substrate and a polyimide layer.

10. The suspension of claim 1 wherein the arms include two layers having different coefficients of thermal expansion.

11. The suspension of claim 1 wherein the flight characteristic is pitch.

12. The suspension of claim 1 wherein the flight characteristic is roll.

13. A disk drive comprising:
a read/write head; and
a suspension including
 a flexure tongue supporting the read/write head,
 two arms disposed on opposite sides of, and coupled to, the flexure tongue, each arm including a heating element contiguously bonded thereto, the heating elements being operable to bend the arms to controllably alter a flight characteristic of the read/write head wherein the heating elements include electrical resistance heaters; and
 a trace layer attached to the arms and including a heater trace, wherein portions of the heater trace comprise the electrical resistance heaters.

14. The disk drive of claim 13 further comprising a read circuit configured to receive a read signal from the read/write head and a control circuit configured to adjust a heat output of the heating elements in response to an intensity of the read signal.

15. The disk drive of claim 14 wherein the control circuit adjusts the heat output thereof by adjusting electrical currents thereto.

16. The disk drive of claim 15 wherein the electrical currents to the two electrical resistance heaters are the same.

17. The disk drive of claim 13 further comprising
 a roll circuit configured to determine a degree of roll of the read/write head, and
 a control circuit configured to adjust a heat output of the heating elements in response thereto.

18. The disk drive of claim 13 wherein the portions of the heater trace have a higher electrical resistivity than a remainder of the heater trace.

19. The disk drive of claim 13 wherein the portions of the heater trace are more narrow than a remainder of the heater trace.

20. The disk drive of claim 13 wherein the portions of the heater trace are thinner than a remainder of the heater trace.

21. The disk drive of claim 13 wherein the portions of the heater trace are joined in a series circuit.

22. The disk drive of claim 13, wherein the arms include two layers having different coefficients of thermal expansion.

23. The disk drive of claim 13, wherein the two layers include a stainless steel substrate and a polyimide layer.

24. The disk drive of claim 13, wherein the flight characteristic is pitch.

* * * * *